US009032832B2

(12) United States Patent
Wu

(10) Patent No.: US 9,032,832 B2
(45) Date of Patent: May 19, 2015

(54) XY ALL-DIRECTIONAL PRECISION ALIGNMENT PLATFORM

(76) Inventor: Mau-Hsiang Wu, Taichung (TW)

( * ) Notice: Subject to any disclaimer, the term of this patent is extended or adjusted under 35 U.S.C. 154(b) by 401 days.

(21) Appl. No.: 13/584,833

(22) Filed: Aug. 14, 2012

(65) Prior Publication Data

US 2013/0291666 A1 Nov. 7, 2013

(30) Foreign Application Priority Data

May 3, 2012 (TW) ............................ 101208321 U

(51) Int. Cl.
*F16H 19/02* (2006.01)
*B25B 11/00* (2006.01)
*G12B 5/00* (2006.01)

(52) U.S. Cl.
CPC ........... *B25B 11/00* (2013.01); *Y10T 74/18792* (2013.01); *G12B 5/00* (2013.01)

(58) Field of Classification Search
USPC .............. 74/471 XY, 490.08, 490.07, 490.04, 74/490.03, 490.02, 490.01
See application file for complete search history.

(56) References Cited

U.S. PATENT DOCUMENTS 5,497,060 A * 3/1996 Juergens, III .................. 700/60
6,135,400 A * 10/2000 Hatti et al. ................ 248/178.1
6,313,945 B1 * 11/2001 Takeuchi ...................... 359/393
7,136,223 B2 * 11/2006 Roeth et al. .................. 359/393
8,659,825 B2 * 2/2014 Fu et al. ........................ 359/391

* cited by examiner

*Primary Examiner* — David M Fenstermacher
(74) *Attorney, Agent, or Firm* — Muncy, Geissler, Olds & Lowe, P.C.

(57) ABSTRACT

An XY all-directional precision alignment platform is provided and includes an XY-axes moving platform including X-axis moving platform and Y-axis moving platform, the X-axis and Y-axis moving platforms being stacked together, and a θ-angle rotating platform, the θ-angle rotating platform stacked onto the carrier surface thereof; wherein the θ-angle rotating platform is driven to perform precise θ-angle rotation achieving 360° and is of a four-layered thickness only, achieving the goal of having a light and thin product.

12 Claims, 9 Drawing Sheets

XY ALL-DIRECTIONAL PRECISION ALIGNMENT PLATFORM

BACKGROUND OF THE INVENTION

1. Technical Field

The present invention is related to an alignment platform, in particular, to an XY all-directional precision alignment platform capable of achieving 360° angle of rotation and is configured to be a thin and high precision of alignment platform.

2. Description of Related Art

Alignment platforms are being widely used in the fields of liquid-crystal display manufacturing, equipment inspection, semiconductor manufacturing, setup inspection, web-printing equipment, or circuit board printing and manufacturing. During equipment inspection, it is necessary to move the alignment platform relatively and conduct related movement procedures. In order to increase the precision and to achieve the requirement of high precision, in addition to the movement relative to the X-axis and Y-axis or the accomplishing of the movements on the XY-axes by extendable components, the platform ought to be equipped with the function of θ angle rotations. However, known arts or products claiming their capability of having the function of θ angle rotation are achieved by mechanisms or structures that mere adapts the indirect use of XXY axes or XYY axes, which obviously cannot be considered as an actual θ angle rotation and their angle of rotation is limited or confined, typically of the range of ±5°. In addition, due to their complexity of component and structures, the thickness of the assembled stacked in combination can reach as many as 6 layers, which fails to meet the requirement of being light and thin in assembly structure. Furthermore, known structures exhibit the drawback of having interferences during their operations and cannot be utilized to achieve the requirement of high precision, which ought to be improved and overcome necessarily.

SUMMARY OF THE INVENTION

The present invention and the disclosure herein is directed to improvements over known XY all-directional alignment platforms that fail to demonstrate a mechanism having actual or real θ angle rotations but a structure utilizing XXY axes or XYY axes to indirect achieving the movement with a layer thickness of a stacked layer in combination reaching as many as 6 layers, unsuitable to equipment assembly requirements of being light and thin. In addition, the rotation movement of known arts exhibit interferences and limits among components and axes, which fails to conform with the industrial requirements and needs.

The present invention provides an XY all-directional precision alignment platform comprising:

an XY-axes moving platform, comprising:

an X-axis moving platform, having at least one guideway unit on a bottom thereof;

a Y-axis moving platform, having at least one guideway unit on a bottom thereof;

said X-axis moving platform and said Y-axis moving platform being stacked together in combination;

a θ-angle rotating platform, comprising:

a platform; an arcuate gear, provided on a bottom of said platform;

a guideway unit, attached to at least one sliding block;

a worm shaft mechanism, engaged correspondingly with said arcuate gear;

said guideway unit and said worm shaft mechanism being arranged corresponding to a carrier surface of said XY-axes moving platform;

said θ-angle rotating platform stacked onto said carrier surface of said XY-axes moving platform, and said sliding block attached correspondingly to said bottom of said platform.

Thereby, said worm shaft mechanism is controlled to drive said arcuate gear such that said θ-angle rotating platform is driven to perform a precise θ angle rotation having a rotation angle achieving 360° and such that a body thickness thereof is of a four-layered thickness only, achieving the goal of having a light and thin product.

DESCRIPTION OF EMBODIMENTS OF THE INVENTION

Figure 1:
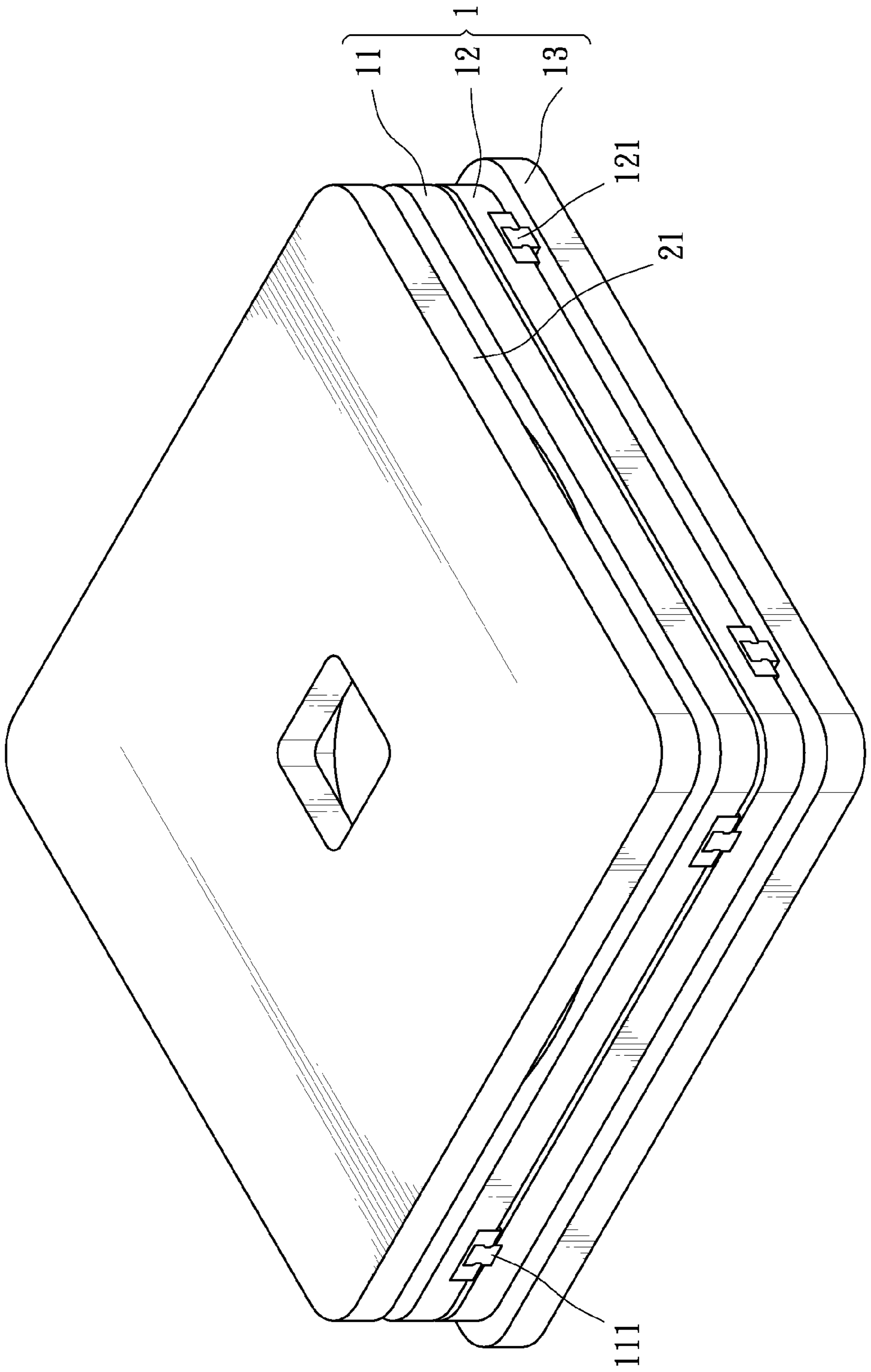
FIG. 1 shows a perspective view of an outer appearance of the a preferred embodiment of the present invention.
Figure 2:
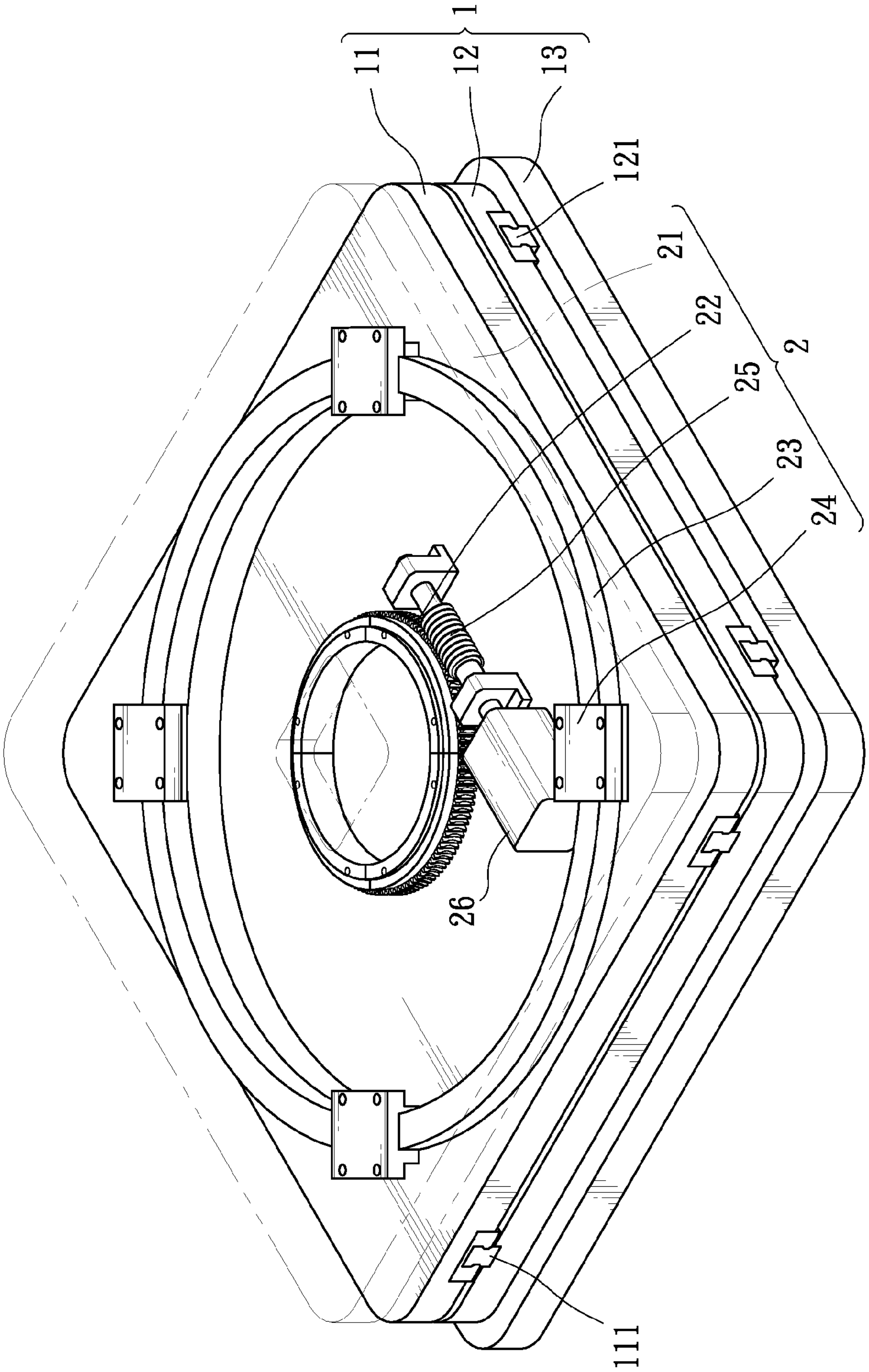
FIG. 2 shows a perspective view of an assembly of a preferred embodiment of the present invention.
Figure 3:
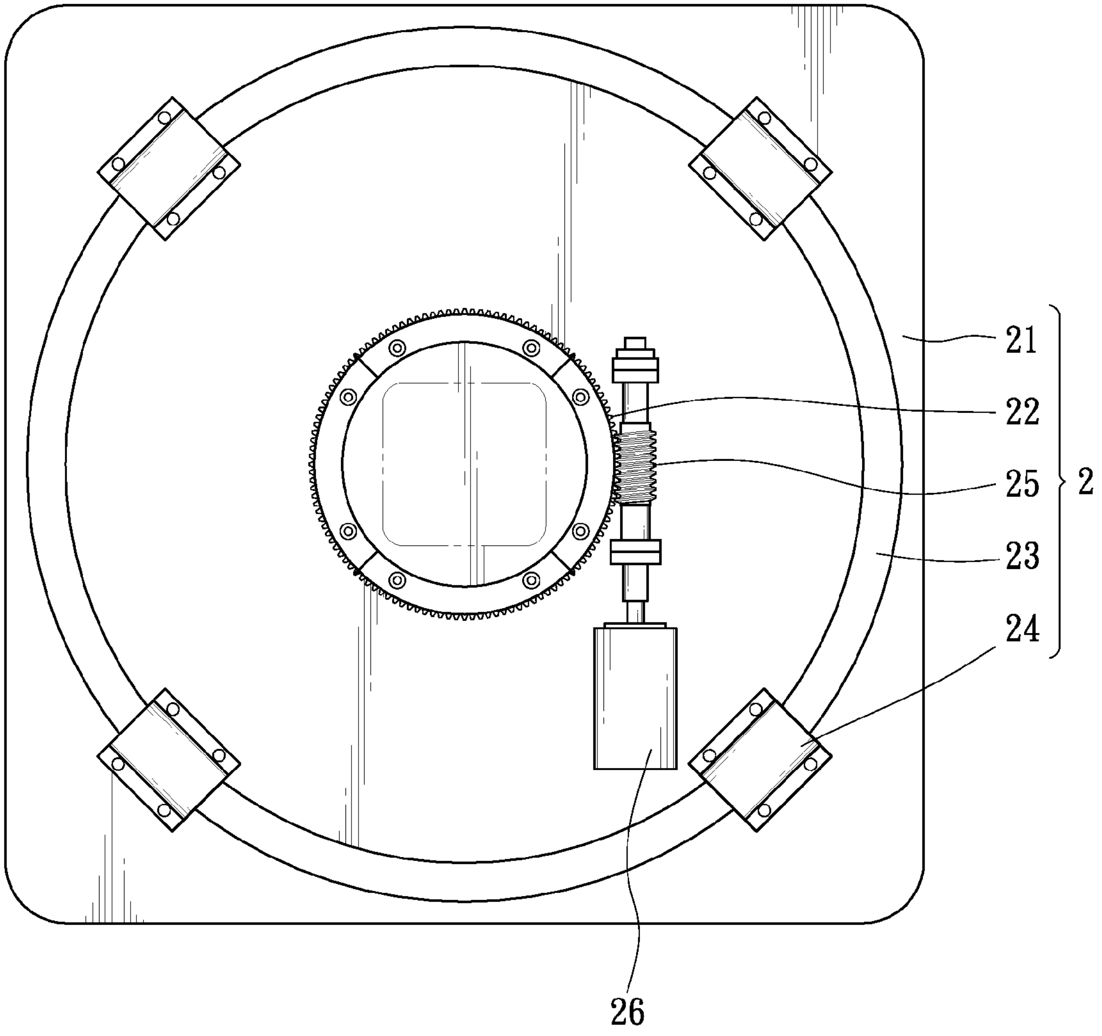
FIG. 3 shows a top view of a θ-angle rotating platform mechanism of the preferred embodiment of the present invention.
Figure 7:
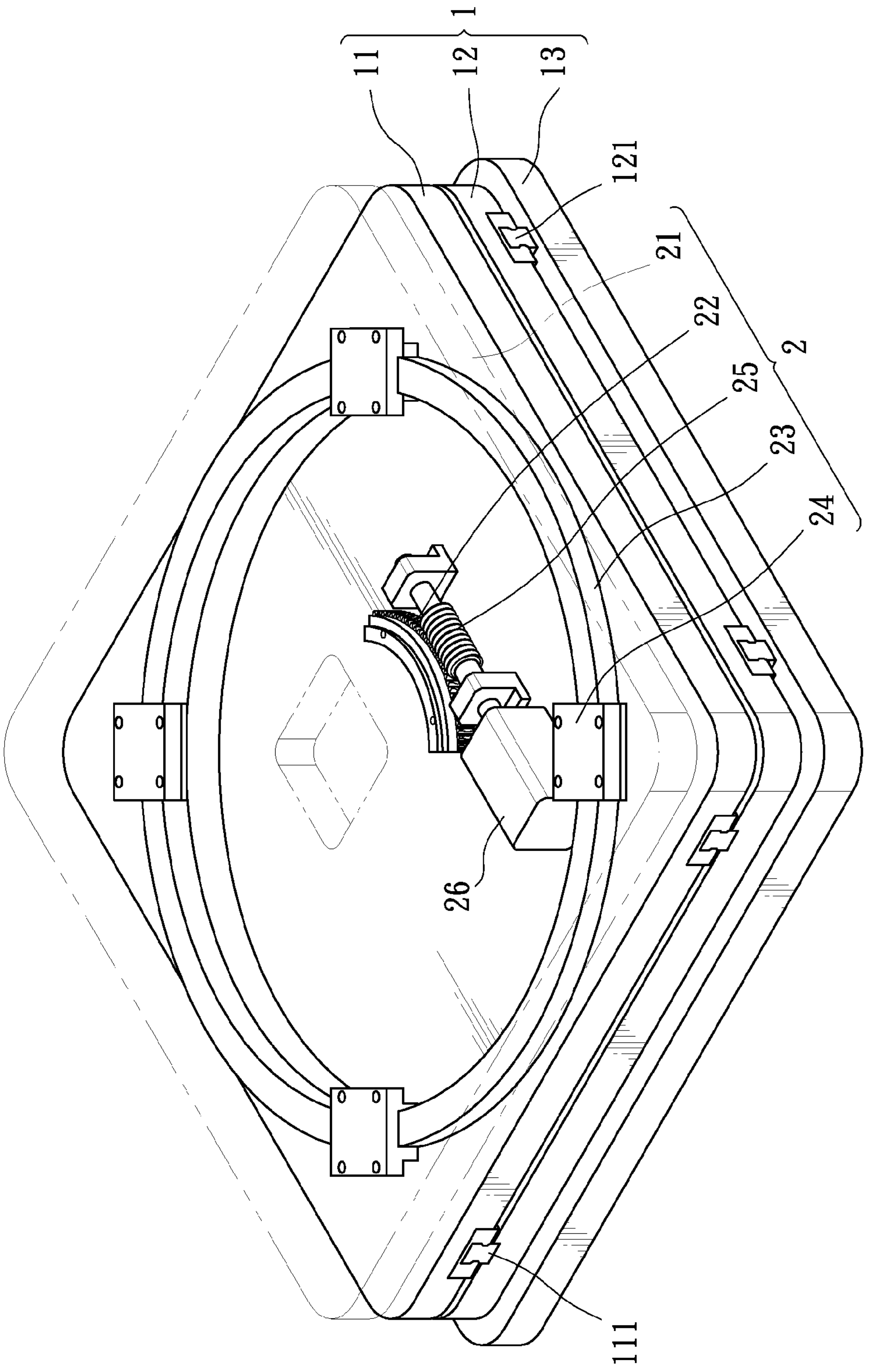
FIG. 7 shows a perspective view of an assembly of another preferred embodiment of the present invention.
Figure 8:
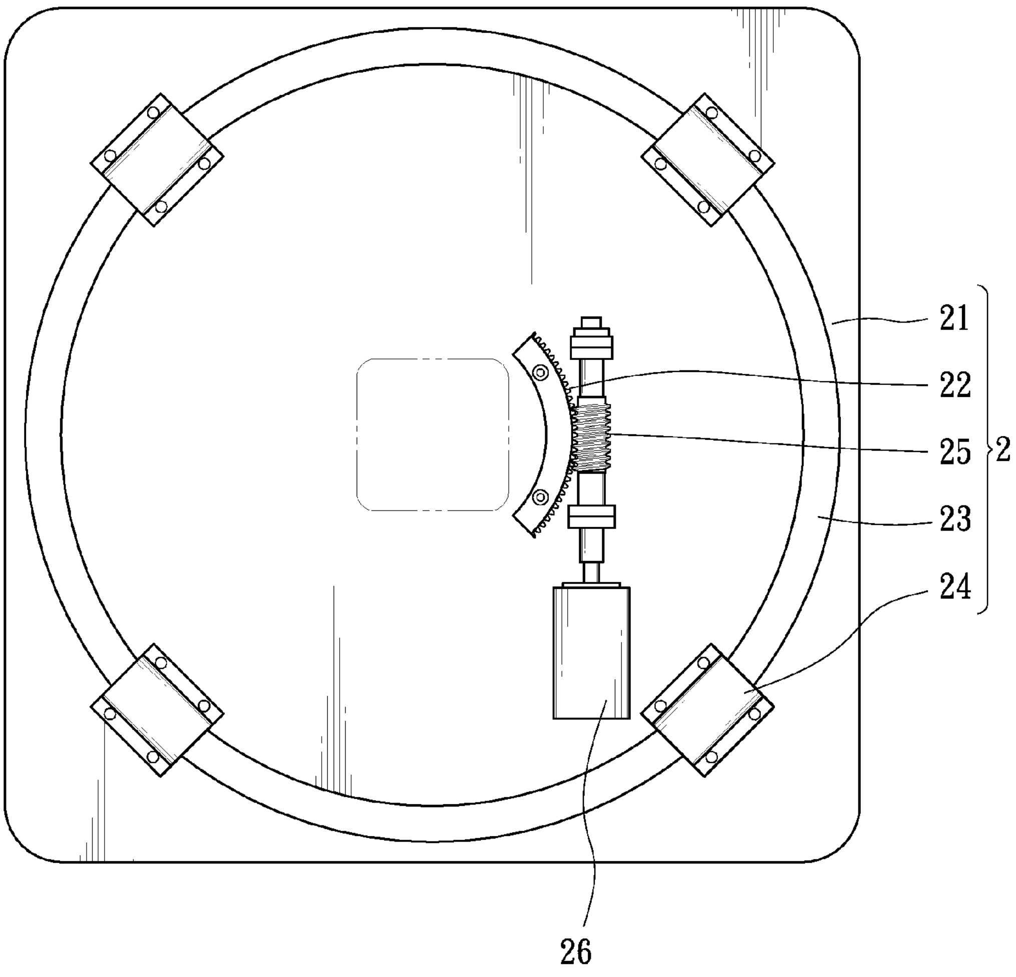
FIG. 8 shows a top view of a θ-angle rotating platform mechanism of another preferred embodiment of the present invention.

As shown in FIGS. 1 to 3, the present invention provides an XY all-directional precision alignment platform comprising:

an XY-axes moving platform 1 provided on provided on a base surface of base 13, comprising:

an X-axis moving platform 11, having at least one guideway unit 111 on a bottom thereof;

a Y-axis moving platform 12, having at least one guideway unit 121 on a bottom thereof;

said X-axis moving platform 11 and said Y-axis moving platform 12 being stacked together in combination, wherein said Y-axis moving platform 12 is parallel to and movably disposal on said base 13;

a θ-angle rotating platform 2, comprising:

a platform 21;

an arcuate gear 22, provided on a bottom of said platform 21;

wherein said arcuate gear 22 is of a ring shape; or said arcuate gear 22 is of an arc shape, as shown in FIGS. 7 and 8;

a guideway unit 23, attached to at least one sliding block 24; wherein said guideway unit 23 is of a ring shape;

a number of said sliding block 24 is adjusted according to a carrier weight rested on said platform 21;

a worm shaft mechanism 25, engaged correspondingly with said arcuate gear 22;

said worm shaft mechanism 25 is driven by a servo-motor 26;

said guideway unit 24 and said worm shaft mechanism 25 being arranged corresponding to a carrier surface of said XY-axes moving platform 1;

said θ-angle rotating platform 2 stacked onto said carrier surface of said X Y-axes moving platform 1, and said sliding block 24 attached correspondingly to said bottom of said platform 21.

Figure 4:
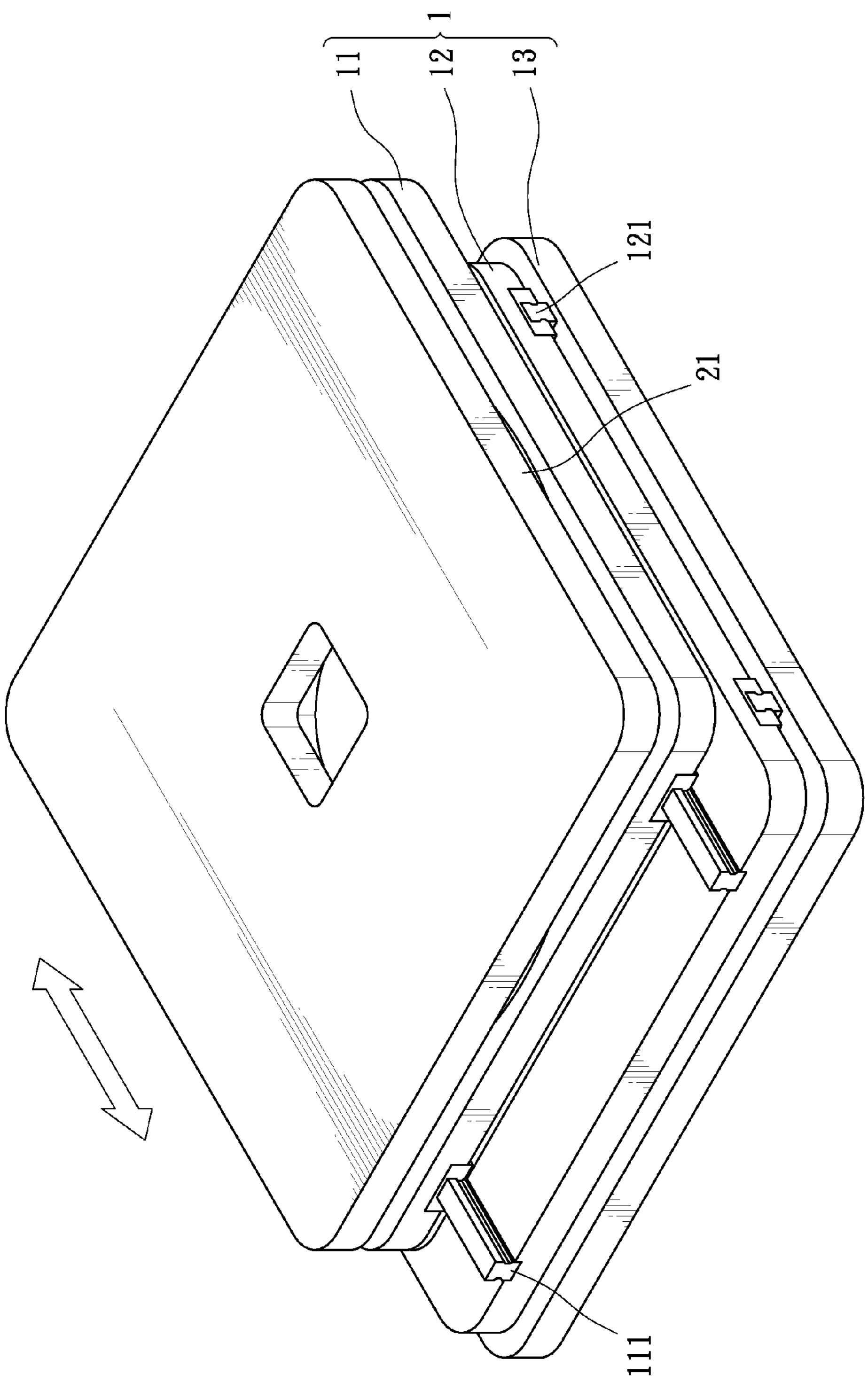
FIG. 4 is a feature illustration showing the movement of the platform of the preferred embodiment of the present invention along an X-axis.
Figure 5:
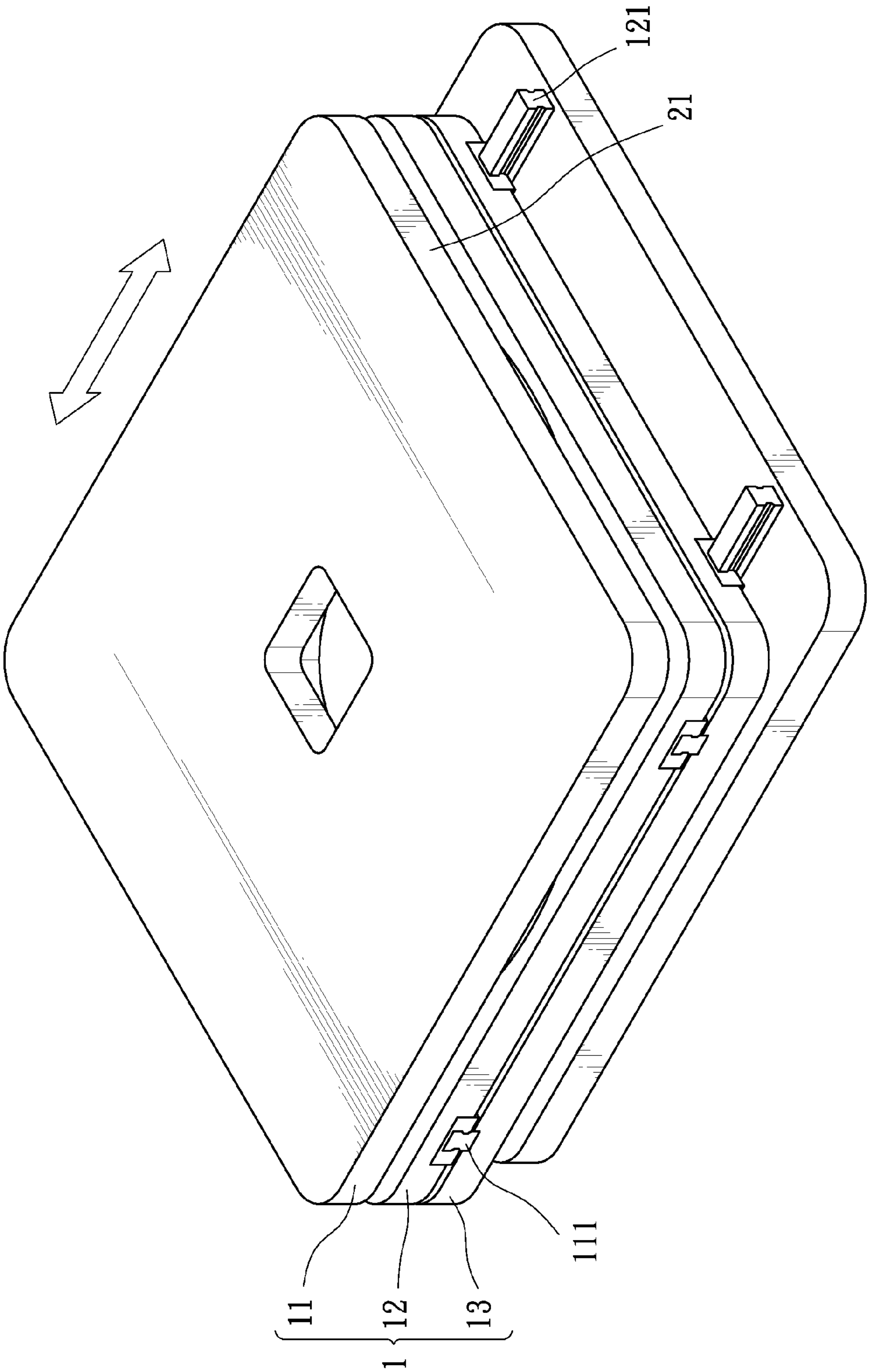
FIG. 5 is a feature illustration showing the movement of the platform of the preferred embodiment of the present invention along a Y-axis.

As shown in FIG. 4, the X-axis moving platform 11 of the XY-axes moving platform 1 of the present invention is able to move under control and along the direction of X-axis.

As shown in FIG. 1, the Y-axis moving platform 12 of the XY-axes moving platform 1 of the present invention is able to move under control and along the direction of Y-axis.

Figure 6:
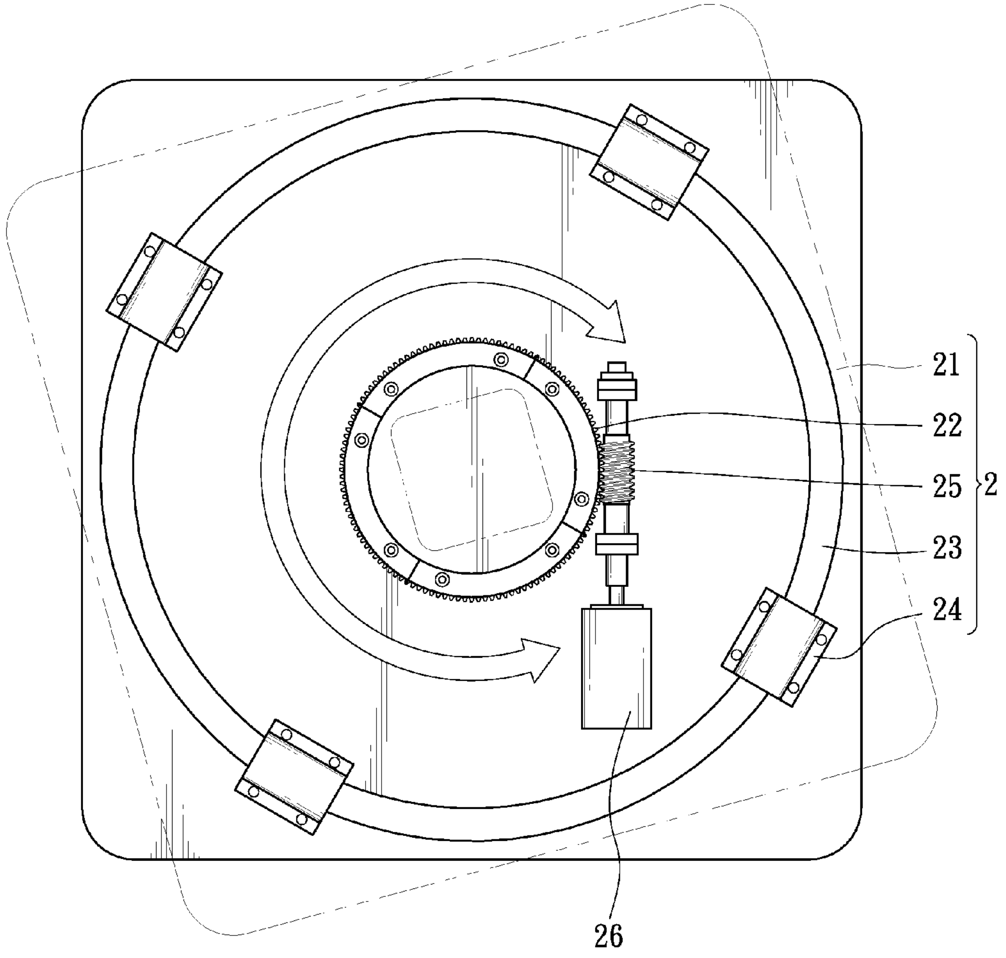
FIG. 6 is a feature illustration showing the rotation of the platform of the preferred embodiment of the present invention at a θ angle.
Figure 9:
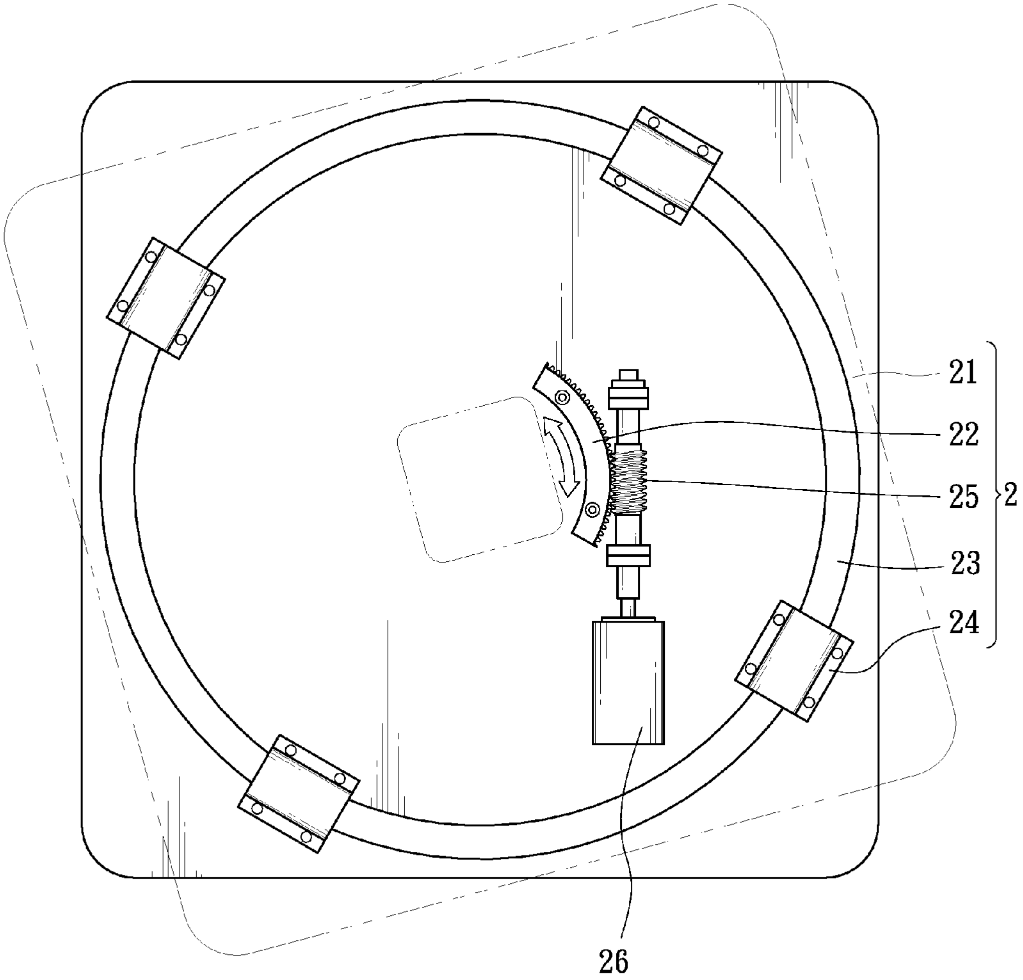
FIG. 9 is a feature illustration showing the rotation of the platform of another preferred embodiment of the present invention at a θ angle.

It can be worthwhile to note that the θ-angle rotating platform 2 is able to perform a precise θ angle rotation based on or via the control of the worm shaft mechanism 25 that drives the arcuate gear 22 and achieving such rotation thereof, as shown in FIGS. 6 and 9.

The θ-angle rotating platform 2 of the present invention has a permanent or predefined movement track such that an optical ruler can installed correspondingly and such that it can rotate independently with an angle of rotation achieving 360° (as the arcuate gear 22 is of a ring shape), satisfying the industrial needs and requirements in full.

Furthermore, the body thickness of the assembled platform of the present invention is reduced to a four-layers thickness only, achieving the goal of having a light and thin product.

What is claimed is:

1. An XY all-directional precision alignment platform comprising:

an XY-axes moving platform provided on a base surface of a base, comprising:

an X-axis moving platform, having at least one guideway unit on a bottom thereof;

a Y-axis moving platform, having at least one guideway unit on a bottom thereof;

said X-axis moving platform and said-Y axis moving platform being stacked together in combination, wherein said Y-axis moving platform is parallel to and movably disposed on said base;

a θ-angle rotating platform, comprising:

a platform;

an arcuate gear, provided on a bottom of said platform;

a guideway unit, attached to at least one sliding block;

a worm shaft mechanism, engaged correspondingly with said arcuate gear;

said guideway unit and said worm shaft mechanism being arranged corresponding to a carrier surface of said XY-axes moving platform;

said θ-angle rotating platform stacked onto said carrier surface of said XY-axes moving platform, and said sliding block attached correspondingly to said bottom of said platform;

wherein said arcuate gear is fixedly attached to said bottom of said platform of said θ-angle rotating platform;

wherein said platform of said θ-angle rotating platform and said arcuate gear are rotatable about an axis perpendicular to said X-axis moving platform, said Y-axis moving platform and said platform of said θ-angle rotating platform;

wherein said worm shaft mechanism is driven by a driving device, and said driving device is located between said platform of said θ-angle rotating platform and said base;

wherein said driving device is disposed to correspond to a side surface of said guideway unit which faces radially.

2. The XY all-directional precision alignment platform as claimed in claim 1, wherein said arcuate gear is of a ring shape.

3. The XY all-directional precision alignment platform as claimed in claim 1, wherein said arcuate gear is of an arc shape.

4. The XY all-directional precision alignment platform as claimed in claim 1, wherein said guideway unit is of a ring shape.

5. A θ-angle rotating platform of an XY all-directional precision alignment platform, comprising:

a platform, an arcuate gear, provided on a bottom of said platform;

a guideway unit, attached to at least one sliding block;

said bottom of said platform attached correspondingly to said sliding block;

said platform being driven by a worm shaft mechanism engaged with said arcuate gear;

wherein said arcuate gear is fixedly attached to said bottom of said platform, said platform and said arcuate gear are rotatable about an axis perpendicular to said platform;

wherein said worm shaft mechanism is driven by a driving device, and said driving device is disposed to correspond to a side surface of said guideway unit which faces radially.

6. The θ-angle rotating platform of an XY all-directional precision alignment platform as claimed in claim 5, wherein said arcuate gear is of a ring shape.

7. The θ-angle rotating platform of an XY all-directional precision alignment platform as claimed in claim 5, wherein said arcuate gear is of a arc shape.

8. The θ-angle rotating platform of an XY all-directional precision alignment platform as claimed in claim 5, wherein said guideway unit is of a ring shape.

9. The XY all-directional precision alignment platform as claimed in claim 1, wherein said driving device is located between said X-axis moving platform and said platform of said θ-angle rotating platform.

10. The XY all-directional precision alignment platform as claimed in claim 1, wherein said arcuate gear and said guideway unit are located on a plane parallel to said X-axis moving platform.

11. The XY all-directional precision alignment platform as claimed in claim 2, wherein said arcuate gear includes a plurality of arched segments, and said arched segments are sequentially disposed annularly on said bottom of said platform.

12. The XY all-directional precision alignment platform as claimed in claim 1, wherein as viewed along said axis which said platform of said θ-angle rotating platform is rotatable thereabout, said driving device is entirely located within a circumferential periphery of said base platform.

* * * * *